United States Patent
Plettenberg

(10) Patent No.: US 6,981,739 B2
(45) Date of Patent: Jan. 3, 2006

(54) CONTROL FOR A ROOF ASSEMBLY OF A VEHICLE, ROOF ASSEMBLY AND METHOD OF CONTROLLING A ROOF ASSEMBLY

(75) Inventor: Paul Theodora Maria Plettenberg, MS Helmond (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/607,762

(22) Filed: Jun. 27, 2003

(65) Prior Publication Data

US 2004/0000801 A1   Jan. 1, 2004

(30) Foreign Application Priority Data

Jun. 28, 2002   (DE) ................................ 102 29 160

(51) Int. Cl.
 *B60J 7/057* (2006.01)
(52) U.S. Cl. ..................................... 296/223
(58) Field of Classification Search ................ 296/223
See application file for complete search history.

(56) References Cited

U.S. PATENT DOCUMENTS

| 5,749,617 A * | 5/1998 | Weissrich et al. ....... 296/107.19 |
| 5,961,177 A * | 10/1999 | Caye et al. ................. 296/213 |
| 6,409,261 B1 * | 6/2002 | Lindinger et al. .......... 296/223 |
| 6,572,184 B2 | 6/2003 | Bauer et al. ................ 296/223 |

FOREIGN PATENT DOCUMENTS

| DE | 199 26 521 A1 | 12/2000 |
| DE | 100 61 187 A1 | 6/2002 |

* cited by examiner

*Primary Examiner*—Dennis H. Pedder
(74) *Attorney, Agent, or Firm*—Todd R. Fronek; Westman, Champlin & Kelly

(57) ABSTRACT

The invention relates to a control for a roof assembly of a vehicle, in which said roof assembly includes several roof members which are individually drivable by drive motors. The control comprises a control unit programmed to control said drive motors, and a switch. It has a range of adjustment with pre-selected positions each corresponding to a pre-selected position of the roof members. The switch can be provided with a momentary function to activate the control unit to energize one or more of said drive motors to move one or more of said roof members to the position corresponding to said pre-selected position of said switch.

20 Claims, 3 Drawing Sheets

CONTROL FOR A ROOF ASSEMBLY OF A VEHICLE, ROOF ASSEMBLY AND METHOD OF CONTROLLING A ROOF ASSEMBLY

BACKGROUND OF THE INVENTION

The invention relates to a control for a roof assembly of a vehicle. More particularly, the present invention relates to a control for a roof assembly of a vehicle having several roof members (1–4), which are individually drivable by drive motors. Such control, roof assembly and method of this kind are known from DE-C-44 11 388 (U.S. Pat. No. 5,749,617). Other examples of prior art controls are known from DE-A-199 26 521 and U.S. Pat. No. 6,056,352.

SUMMARY OF THE INVENTION

The object of the present invention is to provide an improved control, roof assembly and method of the type referred to in the introduction.

According to one aspect of the invention, a control for a roof assembly of a vehicle is provided. The roof assembly includes several roof members which are individually drivable by drive motors. The control includes a control unit programmed to control the drive motors and a switch, having a range of adjustment with pre-selected positions each corresponding to a pre-selected position of the roof members. The switch can be provided with a momentary function to activate the control unit to energize one or more of said drive motors to move one or more of said roof members to the position corresponding to said pre-selected position of said switch. Stated another way, the switch provides means for separate selection of the roof position and activation of the control unit, which leads to a more fool proof and reliable operation of the roof assembly since the roof members start only moving after a selection of the end position has been made.

In one embodiment, it is preferred to construct the switch itself as a push-button, which is actuated in a direction substantially perpendicularly to the range of adjustment of the switch. In this manner, there is no need for a separate push-button, which is an expensive solution and which provides a very simple and comfortable control.

In order to be able to stop the roof members in intermediate positions, it is proposed according to another aspect of the invention to program the control unit such that it is deactivated when the push-button is depressed during movement of the roof member(s) to their pre-selected position, while it is preferred to program the control unit such that it is activated again when the push-button is depressed in a position of the roof members in which they have not yet reached their pre-selected position indicated by the switch. In this manner the user of the roof assembly may obtain more (intermediate) positions of the roof members than selectable by the switch.

In the event that the control is provided with a pinch safety system for the roof members, an option can include programming or adapting the control unit such that the pitch safety system is overridden if the push-button is held during movement of the roof members. In this way, it is possible to close the roof members, also in situations in which the pinch safety system would prevent closing, for example if the resistance on the roof members is too high due to dirt, misalignment or other undesired causes.

BRIEF DESCRIPTION OF THE DRAWING

The invention will be explained in more detail hereafter with reference to the drawings showing an embodiment of the roof assembly and control according to the invention.

DETAILED DESCRIPTION OF THE ILLUSTRATIVE EMBODIMENT

Figure 1:
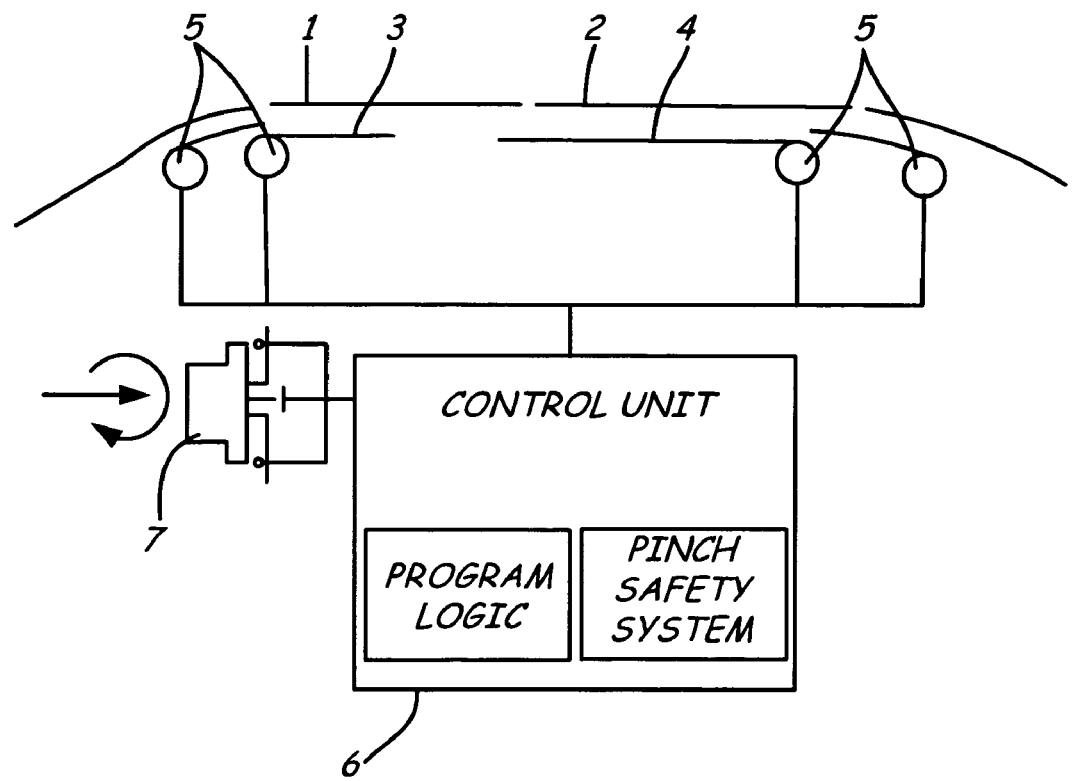
FIG. 1 is a schematic illustration showing parts of a roof assembly and a control for controlling the roof assembly.

The drawings show an exemplary embodiment of a roof assembly for a vehicle and a control therefore. In this particular embodiment, the roof assembly includes a front panel 1 and a rear panel 2 as well as a front sunshade 3 and a rear sunshade 4. It will be obvious that many kinds and combinations of other arrangements of rigid or flexible, transparent or non-transparent roof members are conceivable. The roof members may also be part of a convertible roof. In this manner, the roof assembly is illustrated schematically and should not be considered limiting.

In the embodiment illustrated, all roof members 1–4 have their own electric motors 5 each connected to a power source such as a battery (not shown) and connected to a control unit 6 which is adapted to provide control signals to the electric motors 5 in a programmed manner.

A control element 7 herein exemplified in the form of a switch is connected to the control unit 6 to provide input signals to the control unit 6. The switch 7 is in this case constructed as a rotary switch, which also has a push-button function, but many other forms such as but not limited to toggle, rocker or slide can be used. A first operation of the switch, herein exemplified as rotation of the switch 7, is used to make selections for the control unit 6, whereas a second operation, herein momentary operation, of the control element 7 is used to activate and deactivate the control unit 6. The input signals from the control element 7 to the control unit 6 may be generated in any known way, for example by micro-switches or the like.

Figure 2:
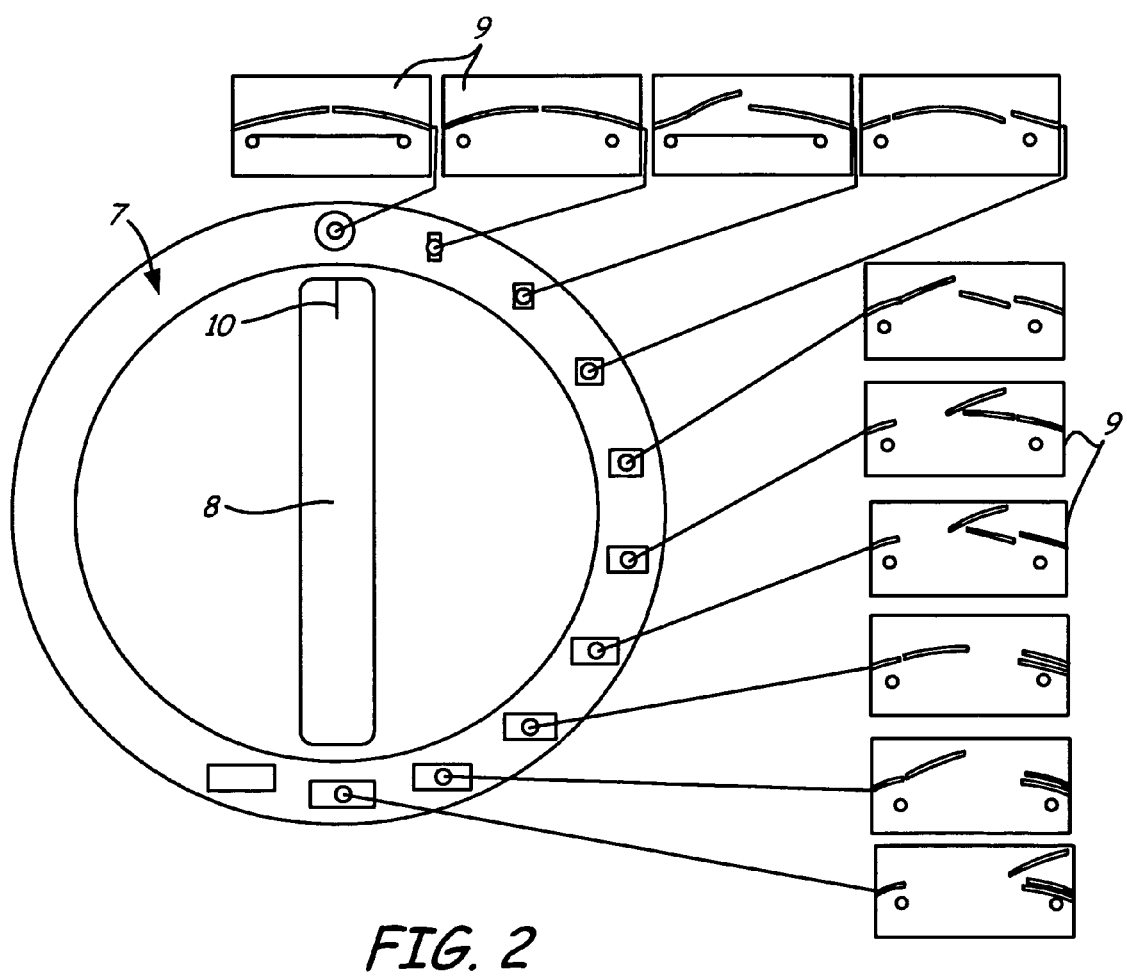
FIG. 2 is a plan view of a switch for use in the control according to FIG. 1.

FIG. 2 shows the switch 7 in a plan view and it shows a grip part 8, which can be gripped by the fingers of a hand in order to press or rotate the switch 7. Around the switch 7 there is provided a ring showing pictograms 9. These pictograms 9 each show a different position of the roof members of the roof assembly, to which position the control unit 6 will move the roof members 1–4 by their electric motors 5 when a mark 10 on the grip part 8 of the switch 7 is aligned with this particular pictogram. The switch 7 can be provided with means to click the switch between the pictograms so that the positions of the pictograms are sensed in a tactile manner.

Figure 3:
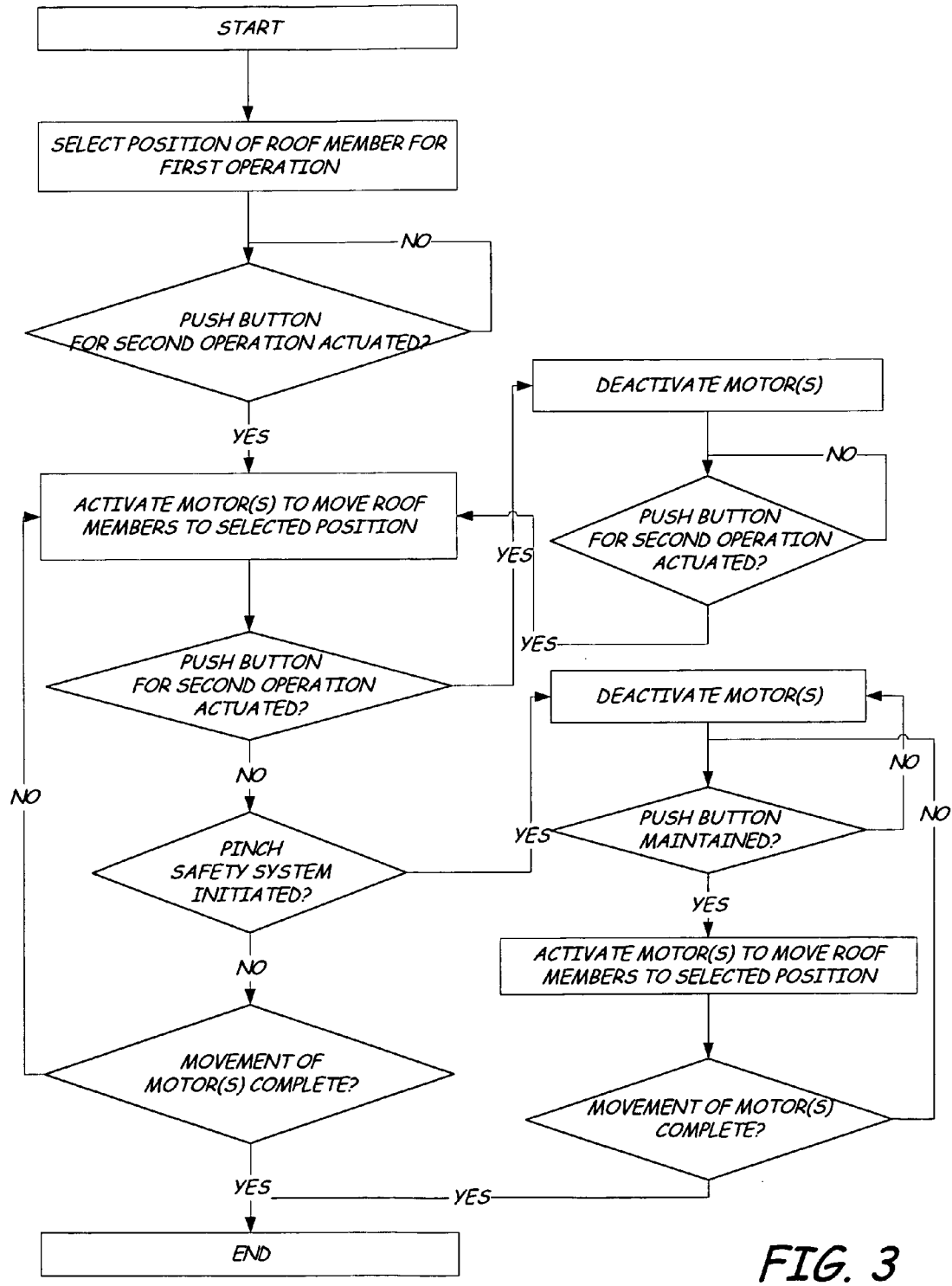
FIG. 3 is a flow diagram of a method of operation for a control unit.

Another aspect of the invention includes a method of controlling the roof assembly by means of the control, which is as follows. An example flow diagram of a method of controlling the roof assembly is illustrated in FIG. 3.

The user first selects from the pictograms 9 a desired position for the roof members 1–4 of the roof assembly. Then the switch 7 is rotated such that the mark 10 is aligned with the selected pictogram 9 corresponding to the desired position. The switch 7 is then operated in another manner, herein by depressing, in order to activate the control unit 6, which in turn transmits output signals to the electric motors 5 in order to have them move their respective roof members 1–4 to the desired position. However, in a further embodiment, if the user wishes to stop the roof members 1–4 from moving before the selected position is reached, the user can again operate the switch 7 (herein by way of example, depressing) again in order to deactivate the control unit 6. The roof members of the roof assembly will then remain in the position which was occupied during actuation of the switch 7. Further operation of the switch 7 again will reactivate the control unit 6 and the roof members 1–4 will continue moving until the desired position is reached or the switch 7 is again operated.

If another position of the roof members is desired, the switch 7 is rotated to the other desired position shown on pictogram 9 and depressed again to start movement of the roof member(s) 1–4 to the other pre-selected position. In this manner the movements of the roof members of the roof assembly are only started when a final selection has been made, which causes the control unit 6 to transmit the necessary output signals to obtain this position.

If the roof assembly is equipped with a pinch safety system, such as forming part of the control unit 7, which prevents parts of the body or objects to be pinched when a roof member 1–4 is moved to the closed position, as is well known in the art, it may be desirable to sense a hold function of the switch 7. In particular, if the second operation of the switch 7 is maintained, herein by holding the push-button in the depressed state, operation of the motors 5 continues without interference from the pinch safety system. In this way, the pinch safety system is overridden and the roof members are moved to the desired position. Especially if this function is used to close all roof members it is possible that the speed of the roof member is increased to close the roof assembly quickly. This may be useful in case of an unwanted person trying to get access to the vehicle through the opening of the roof assembly.

The invention is not restricted to the above-described embodiment as shown in the drawing, which can be varied in several ways without departing from the scope of the invention. For example, it is possible to construct the switch assembly as a slide. The second function, which initiates operation of the control 6 to drive the motors 5, can take many forms such as but not limited to a push-button, toggle, rotary or slide, which may be integrated in the sliding switch in a manner similar to that described above, or may be a separate switch (e.g. momentary button) positioned on or next to the sliding switch.

What is claimed is:

1. A control for a roof assembly of a vehicle having several roof members which are individually drivable by drive motors, said control comprising:
    a control unit programmed to control said drive motors; and
    a control element having a range of adjustment for a first operation thereof with at least three pre-selected positions each corresponding to pre-selected positions of the roof members, wherein said control element is provided with a push-button adapted to be actuated in a direction substantially perpendicular to the range of adjustment of the control element for a second operation separate from the first operation for activating the control unit to energize at least one of said drive motors to move at least one of said roof members to the position corresponding to one of said pre-selected positions of said control element, wherein the control unit is programmed such that it is deactivated when the push-button is depressed during movement of said at least one of said roof members to said one of said pre-selected position.

2. The control according to claim 1, wherein the control unit is programmed such that it is activated again when the push-button is depressed in a position of the roof members in which they have not yet reached their pre-selected position indicated by the control element.

3. The control according to claim 1, provided with a pinch safety system for the roof members, the control unit being programmed such that the pinch safety system is overridden if the second operation of the control element is maintained during movement of the roof members.

4. The control according to claim 1, wherein the control element is constructed as a rotary switch.

5. The control according to claim 1, wherein the pre-selected positions of the control element in the first operation thereof are sensible in a tactile manner.

6. A method of controlling a roof assembly of a vehicle, said roof assembly including several movable roof members which are individually drivable by drive motors, said method including the steps of:
    providing a control comprising a control unit programmed to control said drive motors,
    moving a switch of said control to one of a set of at least three pre-selected positions corresponding to one of a set of pre-selected positions of the roof members,
    momentarily activating the control unit with a push-button function that is activated by depressing the switch using an operation separate from moving the switch to said one of a set of at least three pre-selected positions to energize at least one of said drive motors to move at least one of said roof members to the position corresponding to one of said pre-selected positions of said switch; and
    deactivating movement of said at least one of said roof members during movement of said at least one of said roof members by depressing the switch.

7. A control for a roof assembly of a vehicle having several roof members which are individually drivable by drive motors, said control comprising:
    a control unit programmed to control said drive motors; and
    a control element having a range of adjustment for a first operation thereof with at least three pre-selected positions each corresponding to pre-selected positions of the roof members, wherein said control element is provided with a push-button function integrated with the control element and adapted to be actuated in a direction substantially perpendicular to the range of adjustment of the control element for a second operation separate from the first operation for activating the control unit to energize at least one of said drive motors to move at least one of said roof members to the position corresponding to one of said pre-selected positions of said control element.

8. The control according to claim 7, wherein the control unit is programmed such that it is deactivated when the push-button is depressed during movement of said at least one of said roof member to said pre-selected position.

9. The control according to claim 8, wherein the control unit is programmed such that it is activated again when the push-button is depressed in a position of the roof members in which they have not yet reached said pre-selected position indicated by the control element.

10. The control according to claim 7, provided with a pinch safety system for the roof members, the control unit being programmed such that the pinch safety system is overridden if the second operation of the control element is maintained during movement of the roof members.

11. The control according to claim 7, wherein the control element is constructed as a rotary switch.

12. The control according to claim 7, wherein the pre-selected positions of the control element in the first operation thereof are sensible in a tactile manner.

13. A roof assembly for a vehicle, said roof assembly comprising:
several roof members which are individually drivable by drive motors; and
a control operably coupled to the drive motors, the control comprising a control unit programmed to control said drive motors and a control element having a range of adjustment for a first operation thereof with at least three pre-selected positions each corresponding to pre-selected positions of the roof members, wherein said control element is provided with a push-button adapted to be actuated in a direction substantially perpendicular to the range of adjustment of the control element for a second operation separate from the first operation for activating the control unit to energize at least one of said drive motors to move at least one of said roof members to the position corresponding to one of said pre-selected positions of said control element, wherein the control unit is programmed such that it is deactivated when the push-button is depressed during movement of said at least one of said roof members to said one of said pre-selected position.

14. The roof assembly of claim 13 wherein the control unit is programmed such that it is activated again when the push-button is depressed in a position of the roof members in which they have not yet reached their pre-selected position indicated by the control element.

15. The roof assembly of claim 13, provided with a pinch safety system for the roof members, the control unit being programmed such that the pinch safety system is overridden if the second operation of the control element is maintained during movement of the roof members.

16. The roof assembly of claim 13, wherein the control element is constructed as a rotary switch.

17. The roof assembly of claim 13, wherein the pre-selected positions of the control element in the first operation thereof are sensible in a tactile manner.

18. The method of claim 6 wherein moving the switch of said control to one of a set of at least three pre-selected positions comprises moving a rotary switch.

19. The method of claim 6 further comprising reactivating the control unit with the push-button function by depressing the switch in a position of the roof members in which they have not yet reached their pre-selected position indicated by the control element.

20. The method of claim 6 wherein the roof members are provided with a pinch safety system, the method further comprising overriding the pinch safety system if the push-button function is maintain during movement of the roof members.

* * * * *

UNITED STATES PATENT AND TRADEMARK OFFICE
CERTIFICATE OF CORRECTION

PATENT NO. : 6,981,739 B2 Page 1 of 1
APPLICATION NO. : 10/607762
DATED : January 3, 2006
INVENTOR(S) : Paul Theodora Maria Plettenberg It is certified that error appears in the above-identified patent and that said Letters Patent is hereby corrected as shown below:

Col. 4, line 2, replace "said one" with -- said each-- .

Signed and Sealed this

Twenty-seventh Day of November, 2007

JON W. DUDAS
*Director of the United States Patent and Trademark Office*